US008843157B2

(12) United States Patent  (10) Patent No.: US 8,843,157 B2
Miyake et al.  (45) Date of Patent: Sep. 23, 2014

(54) DYNAMIC TRAVEL BEHAVIOR ESTIMATION IN MOBILE NETWORK

(75) Inventors: Motoharu Miyake, Sunnyvale, CA (US); Fujio Watanabe, Union City, CA (US); Daichi Funato, Mountain View, CA (US)

(73) Assignee: NTT DoCoMo, Inc., Tokyo (JP)

( * ) Notice: Subject to any disclaimer, the term of this patent is extended or adjusted under 35 U.S.C. 154(b) by 76 days.

(21) Appl. No.: 13/281,575

(22) Filed: Oct. 26, 2011

(65) Prior Publication Data

US 2012/0108261 A1 May 3, 2012

Related U.S. Application Data

(60) Provisional application No. 61/407,422, filed on Oct. 27, 2010.

(51) Int. Cl.
*H04W 24/00* (2009.01)
*H04W 4/02* (2009.01)

(52) U.S. Cl.
CPC .................... *H04W 4/028* (2013.01)
USPC ............... 455/456.1; 455/453; 455/404.2; 455/440; 455/457

(58) Field of Classification Search
USPC ............ 455/444, 456.1, 457, 453, 440
See application file for complete search history.

(56) References Cited

U.S. PATENT DOCUMENTS

| | | | | |
|---|---|---|---|---|
| 5,754,959 | A * | 5/1998 | Ueno et al. | 455/453 |
| 6,167,279 | A * | 12/2000 | Chang et al. | 455/462 |
| 6,389,008 | B1 * | 5/2002 | Lupien et al. | 370/352 |
| 7,177,653 | B2 * | 2/2007 | McAvoy | 455/456.1 |
| 7,259,668 | B2 * | 8/2007 | Casey | 340/539.13 |
| 7,260,396 | B2 * | 8/2007 | Balachandran et al. ... | 455/435.1 |
| 7,751,839 | B2 * | 7/2010 | Bowers et al. | 455/509 |
| 8,135,402 | B1 * | 3/2012 | Shetty et al. | 455/434 |
| 8,195,167 | B1 * | 6/2012 | Vargantwar | 455/442 |
| 8,346,240 | B2 * | 1/2013 | Morales Barbosa | 455/422.1 |
| 2002/0022487 | A1 * | 2/2002 | Ahn | 455/453 |
| 2002/0183960 | A1 * | 12/2002 | Chiou et al. | 702/150 |
| 2004/0162071 | A1 * | 8/2004 | Grilli et al. | 455/435.1 |
| 2004/0259566 | A1 * | 12/2004 | Maanoja et al. | 455/456.1 |
| 2005/0060089 | A1 * | 3/2005 | Garin et al. | 701/213 |
| 2005/0164709 | A1 * | 7/2005 | Balasubramanian et al. | 455/453 |
| 2005/0282538 | A1 * | 12/2005 | Balon et al. | 455/423 |
| 2006/0159061 | A1 * | 7/2006 | Takano et al. | 370/352 |
| 2007/0143005 | A1 * | 6/2007 | Chiou | 701/206 |
| 2007/0279281 | A1 * | 12/2007 | Oda et al. | 342/357.06 |

(Continued)

OTHER PUBLICATIONS

"Generating Trajectories from Mobile Phone Data" Jul. 30, 2009 Schlaich et al.*

(Continued)

*Primary Examiner* — Mehmood B Khan
(74) *Attorney, Agent, or Firm* — Blakely, Sokoloff, Taylor & Zafman LLP (57) ABSTRACT

A method and apparatus is disclosed herein for estimating travel behavior in a mobile network. In one embodiment, the method comprises receiving event data indicative of user equipment location, pre-processing received event data to produce pre-processed data, performing straight line interpolation on pre-processed data of one or more individuals in the population to estimate intermediate positions of a trajectory of each of the one or more individuals from a first position to a second position, and counting a number of individuals in population at a given time and at a given area.

20 Claims, 8 Drawing Sheets

(56) References Cited

U.S. PATENT DOCUMENTS

| | | | |
|---|---|---|---|
| 2008/0057955 A1* | 3/2008 | Choi-Grogan | 455/435.1 |
| 2008/0112366 A1* | 5/2008 | Uchida et al. | 370/332 |
| 2008/0139169 A1* | 6/2008 | Fujimoto | 455/404.2 |
| 2010/0113063 A1* | 5/2010 | Han et al. | 455/456.1 |
| 2010/0159945 A1* | 6/2010 | Brisebois | 455/456.1 |
| 2011/0039576 A1* | 2/2011 | Prakash et al. | 455/456.1 |
| 2011/0096732 A1* | 4/2011 | Rashid et al. | 370/329 |
| 2011/0137907 A1* | 6/2011 | Ikenoue | 707/740 |
| 2011/0287801 A1* | 11/2011 | Levin et al. | 455/517 |
| 2012/0155341 A1* | 6/2012 | Yamamoto et al. | 370/281 |

OTHER PUBLICATIONS

"Generating TRajectories from Mobile Phone Data", Jul. 30, 2009, Schlaich et al.*

* cited by examiner

DYNAMIC TRAVEL BEHAVIOR ESTIMATION IN MOBILE NETWORK

PRIORITY

The present patent application claims priority to and incorporates by reference the corresponding provisional patent application Ser. No. 61/407,422, titled, "Methods and Apparatuses for Dynamic Travel Behavior Estimation in Mobile Network," filed on Oct. 27, 2010.

FIELD OF THE INVENTION

Embodiments of the present invention relate to the field of dynamic population movement estimation and migration counting using data generated in mobile network; more particularly, embodiments of the present invention relate to dynamic population movement estimation and migration counting using straight line interpolation to estimate the trajectory of user equipment movement.

BACKGROUND OF THE INVENTION

In order to obtain a social support ecosystem, geo-location based applications now receive so much attention from users and industry alike. Such applications obtain information about a user's mobility using cellular phones and tracking user's location. By tracking the mobility of users, fluctuations of a population in a certain geographic area can be estimated based on counting population migration at the mobile travel behavior server. In order to count population migration at the mobile travel behavior server, these applications review and analyze data generated from the mobile phone, such as control data and user data. These control data and user data generated from the mobile phone are referred to herein as an event data.

Today, a cellular phone is carried and used by a large population. Even while it is not actively used, the cellular phone transmits certain periodic event data to their associated base station (BS) as part of its registration, location area update, and a keep alive operations. These messages are received at the BS, radio network controller, or serving GPRS support node (SGSN) so that the mobile phone can be located at a sector level location at a given time. The mobile network operators, upon collecting such event data from all subscribers, may analyze these data and extract useful information that would help improve society in general and accelerate new business for the corporate customer. Some examples of where mobile travel behavior analysis may help improve society include urban planning, traffic planning, and disaster prevention. As another example, these event data along with some personal attributes such as gender, age etc. of the subscriber may be used for important statistics analysis on population distributions within a given geographical area and time. Conventionally, user statistical distributions are obtained through census surveys, which are typically carried out once every several years.

These event data and personal attributes of the subscribers have been used to realize the above applications to achieve the following objectives 1) obtaining the geographical distribution of subscribers at a given time instant (hourly, daily, weekly, monthly, etc.), and 2) obtaining the flow of population between different geographical area. For the first objective, the goal is to obtain the population in a municipality (or mesh, hexagonal sector, etc.) at a given time of the day. The second objective is used to determine dynamic population migration such as inflow and outflow in a level of municipal, or mesh, or sector or their sojourn time, and their movement distance.

To obtain dynamic population migration, understanding the geographical distribution of subscribers is a challenging task due to the limited information contained in the event data. The event data transmitted by the mobile phone only provides sector-level location information, where the sector size may range from few hundreds of meters to few kilometers. It is not the same as a GPS signal, and it does not include any accurate location even if the mobile phone sends hundreds of transmissions with event data. Accurate mapping of a subscriber's location within a given sector requires non-trivial signal processing techniques that, for example, involve the use of associated BS location information, subscriber's trajectory source/destination position, and estimated trajectory. A second important challenge is that the event data is collected with low frequency. The periodic messages (e.g., periodic location update messages) are transmitted by the user equipment (UE) including communication functions on time intervals that will be on the order of an hour, and the exact frequency of periodic messages can be customized. In some literature, the UE is considered as the mobile phone. While a longer time interval between two periodic messages provides lower messaging overhead and less battery consumption at the UE, it also limits the tracking accuracy of the UE's location.

If the UE is mobile and it crosses the boundary of a location area (LA) that is composed of several sectors, the UE transmits another event data called "location update message (LAU)" to its associated BS which will be located in the next location area. In rural areas, the LA covers a much larger area than one in the urban area, and the number of sectors within the LA is expected to be large; therefore, the mobile travel behavior analysis is mainly composed of periodic message in the rural area due to the absence of LA boundary crossings.

A third example for the event data transmitted by the UE are power-on and power-off messages. Compared to the periodic message and LAU messages, these are less frequently transmitted, but provide sector-level location information for the UE in a way similar to the periodic message and the LAU message. Other examples of the event data messages transmitted by the UE are phone call/receive and SMS message sent/receive.

The prior art related to mobile travel behavior analysis is related to traffic monitoring systems. The prior art discloses identifying the traffic jams and congestion in an online manner using the event data of the UE in a cellular system. The event data are then shared among the users who would like to optimize their travel time with the knowledge of the traffic jam information. In order to estimate traffic jams, a key component that has been developed is to accurately estimate the velocities of the mobile users, sometimes with the help of geographic information & transport network information. However, the prior art does not track individual users' trajectories, and is limited to detecting overall traffic congestions.

The prior art does disclose a method of generating trajectories from mobile phone's data have been discussed. In particular, there exists a general framework for estimating the trajectories from mobile phone's event data. Given the geographic information & transport network information and the location area code (LAC) sequences of the users, one algorithm, referred to as the Needleman-Wunsch algorithm, has been applied to determine the best geographic information & transport network information sequence corresponding to the trajectory samples. The basic goal of this framework is to identify a given estimated LAC trajectory sequence from various possible geographic information & transport network information sequences, and find the best sequence match. However, the algorithm does not consider any information about the two-dimensional distribution of a user's trajectory, the actual physical distances involved between different locations, trip durations, etc. Moreover, a concept of geographical mesh is not used, and the algorithm tries to find trajectories between different LACs. In another method, origin-destination matrices are generated from mobile phone's trajectories has been discussed using the basic framework as in other prior art, and includes the similar limitations.

Some prior art methods of estimating the shortest-path trajectory between the source location and the destination location have been introduced. This prior art includes discussions of possible shortest path algorithms, including the Dijkstra's algorithm, the A* algorithm, and the Dempster-Shafer method. However, typical applications of these methods are online shortest-path route estimation and recommendation to the user for choosing the best path, e.g., for car navigation. Moreover, available location data samples in these works are typically obtained from GPS devices rather than mobile-phone's event data. The GPS information provides accurate location information in a general sense. On the other hand, not all the UEs are equipped with GPS devices. Even if GPS is embedded in the UE, the users may not be comfortable with allowing the GPS information to be used by other entities. Therefore, the usage of GPS information requires additional complexities to protect user's privacy when the location information is transferred from the UEs to the BSs (e.g., network).

SUMMARY OF THE INVENTION

A method and apparatus is disclosed herein for estimating travel behavior in a mobile network. In one embodiment, the method comprises receiving event data indicative of user equipment location, pre-processing received event data to produce pre-processed data, performing straight line interpolation on pre-processed data of one or more individuals in the population to estimate intermediate positions of a trajectory of each of the one or more individuals from a first position to a second position, and counting a number of individuals in population at a given time and at a given area.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Methods and apparatuses are disclosed herein for implementing the mobile travel behavior analysis. One goal of embodiments of the present invention is, using the event data and personal attributes as described above, obtaining reliable and accurate location estimates of the UE with a high resolution (e.g., at every minute within a given day). Using UE's location estimates, the inflow and outflow of population between different geographical areas within a given time interval will be estimated.

In one embodiment, the mobile travel behavior analysis system comprises several servers that store different information. In addition, in one embodiment, the mobile travel behaviour analysis system uses event data generated by user equipment (UE) over communication system. In another embodiment, the system also uses other data such as, for example, personal attribute information as well as geographic information & transport network information in order to increase accuracy of determining a UE's location and its trajectory.

In one embodiment, a location update message and a periodic location update message are event data that are used. The location update message is generated by the UE whenever the UE across the location area boundary, and the UE transmits its periodic location update message periodically. In addition, other event data is transmitted when a user turns on/off the UE and the UE needs to authenticate and associate to the base station (BS) or the access point (AP). Since the BS or the AP is connected to network via wired-line or wireless, the event data is stored at a mobility server in the network.

In one embodiment, the mobile travel behavior system combines and analyzes a set of data stored at different servers such as a mobility server, a subscriber data server, and a geographical data base server. After analyzing data using the UE's trajectory estimation, geographic distribution of UEs at a given time instant are determined.

In one embodiment, the mobile travel behavior analysis includes of several operations to identify the UE's trajectory and obtain the accurate population count. First, in order to extract geographic distribution of UE, the mobile travel behaviour system obtains appropriate data including event data from different servers and pre-processes event data. The pre-processed data is then filtered based on one or more different attributes. Thereafter, one or more interpolation algorithms are applied to the filtered information together with geographic information & transport network information located in the geographic data base server to obtain geographic distribution of UEs and to estimate UE's movement trajectory. In one embodiment, the geographic distribution of UEs in the time domain is compared and then the inflow and outflow of population between different geographical areas are obtained.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Techniques for dynamic population migration estimation and counting in mobile network are described. It is to be understood that the following example(s) is (are) for the purpose of explanation and not limitation.

Figure 1:
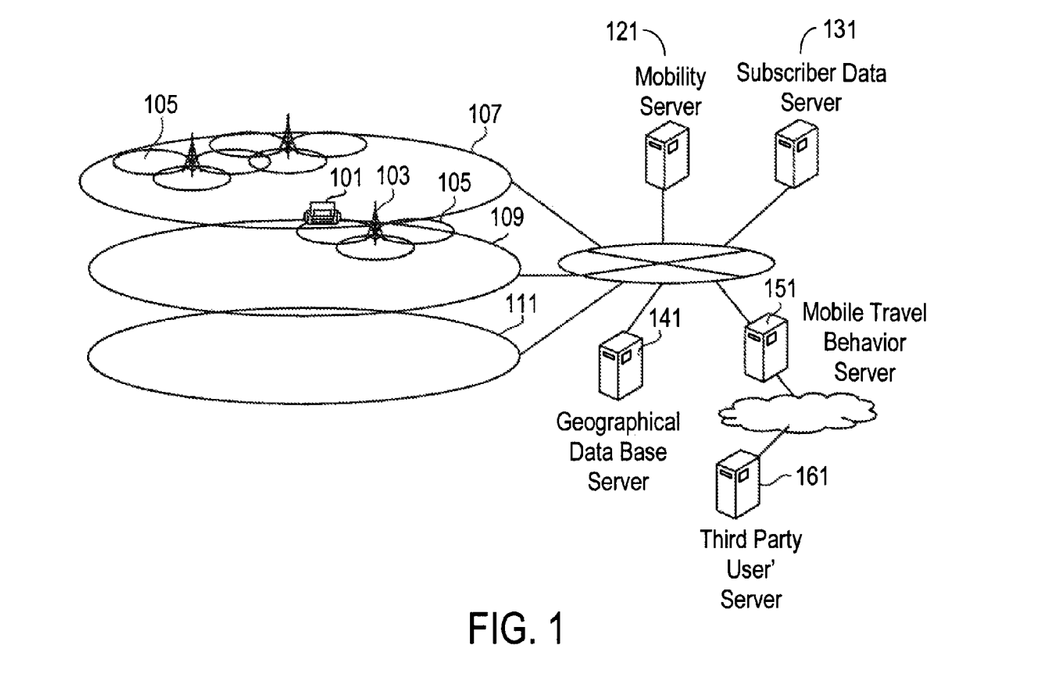
FIG. 1 is a diagram of overview and architecture of mobile travel behavior analysis according to one embodiment.

FIG. 1 illustrates an overview of mobile network arrangement for mobile travel behavior analysis. Referring to FIG. 1, user equipment (UE) 101 includes communication functionality to enable wirelessly communicating with the wireless base station called "base station (BS)" or "access point (AP)" 103. AP 103 is mainly used for the wireless LAN access point connecting to the Internet. In this embodiment, the term "BS" will be used below to indicate a network connection point. UE 101 may have different communication functionality, and is not limited to wireless communication capabilities such as 2G (2nd generation) cellular system, 3G (3rd generation) cellular system, wireless LAN (e.g., WiFi) and Bluetooth. UE 101 may also have wired communication functionality such as, for example, Ethernet. Examples of the UE include, but are not limited to, a mobile phone, a smart phone, and smart tablet commuters with communication capabilities. Although the following example will describe this method and apparatus using one UE, it may be used for multiple UEs.

BS 103 may have multiple communication functionality to support different systems. In one embodiment, BS 103 has few sectors 105 in order to increase spectra efficiency. In FIG. 1, three sectors are illustrated per one BS. Each sector at a BS covers a small geographical area which has a unique sector identification code. In one embodiment, Location Area (LA) 107 comprises several BSs 103 including sectors 105; alternatively, an LA may include only one BS and include only one sector.

While UE 101 is communicating with BS 103, UE 101 generates data event data 201. Event data 201 generated by UE 101 is used to estimate dynamic population (e.g., user, UE) migration and population counts in terms of inflow and outflow by the mobile travel behavior server 151. In one embodiment, event data 201 is formed from a subset of control data 211 and user data 221 shown in FIG. 2.

Figure 2:
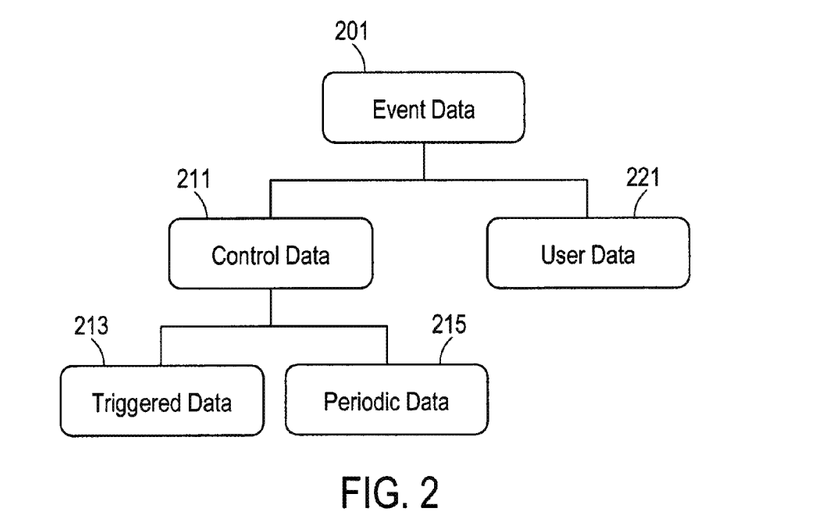
FIG. 2 is a diagram of event data structure according to one embodiment.

Referring to FIG. 2, control data 211 is categorized into two different data referred to as triggered data 213 and periodic data 215. Triggered data 213 is transmitted by UE 101 whenever UE 101 has a special event that has occurred such as crossing a location area (LA) boundary, power on and power off and so forth. Periodic data 215 is defined to be transmitted periodically. An example of periodic data is the sending of a periodic location update message that is transmitted by UE 101 at certain time intervals. An exact frequency of the periodic message transmissions can be customized and/or modified over time. On the other hand, any related private data such as data communication and voice communication is defined as user data 221.

One embodiment of the location update procedure that generates event data allows UE 101 to provide current location area information to the cellular network whenever UE 101 moves from one location area, e.g., LA 107 in FIG. 1, to another location, e.g., LA 109 in FIG. 1. UE 101 is responsible for detecting the location area code (LAC) which is a unique identification per each LA. When UE 101 finds that the location area code (LAC) is different from its last update LAC, UE 101 transmits another location update message containing a new location area code to the network server. This event data (location update) includes UE's previous location area code (e.g., location area identification (LAI) and its Temporary Mobile Subscriber Identity (TMSI)). In this example, the network server is a mobility server 121. As an example, mobility server 121 may perform functions similar to a MSC VLR (mobile switching center visiting location register) in a GSM network.

In the example of a mobile travel behavior analysis architecture shown in FIG. 1, there are several servers. As described above, mobility server 121 includes functionality to collect event data 201 generated by UE 101 and track the location of UE 101 based on event data 201. The location estimation of UE 101 based on event data 201 is explained below. In one embodiment, event data 201 includes not only information generated by UE 101 in the cellular system, but also information generated by UE 101 in the wireless LAN and any other systems even when the single UE 101 has multiple communication capabilities.

Subscriber user data server 131 has an interface to receive and a memory to store subscriber's information referred to herein as "personal attribute information" of UEs such as, for example, but not limited to, gender, address, age and so on. Because of privacy information of the subscriber, in one embodiment, subscriber data server 131 is highly protected from malicious access. Geographical data base server 141 has an interface to receive and a memory to store geographic information as well as the transport network information such as, for example, geographic map information and traffic information including the train timetable and traffic information such as, for example, construction work, road blocked, traffic regulation status information, toll gate information, disaster information, and reroute information. Mobile travel behavior server 151 includes a memory and processor to implement a set of tools that captures, stores, analyzes, manages, and presents data that are linked to information stored at mobility server 121, subscriber data server 131 and geographical data base server 141. Information stored and analyzed at mobile traffic behavior server 151 is accessible by third party user's server 161.

One goal of techniques described herein is to obtain the geographical distribution of users at a given time instant (e.g., hourly, daily, weekly, monthly, etc.) and to estimate the inflow and outflow of population migration between different geographical areas. In order to achieve this goal, the event data generated by UE 101 is used. These data will be temporary or permanently stored in mobility server 121. While a longer time interval between two event data provides lower message overhead and less battery consumption at the UE, the received event data does not explicitly indicate UE's location. Since most of event data will not include GPS (global positioning system) information unless it is specifically included, it is difficult to estimate the exact location of UE based on the event data. This is because the BS connected with the UE via wireless or wired-line will be considered as the closest location of the UE. Therefore, the BS receiving the event data implicitly indicates a current location of the UE.

In one embodiment, the frequency of event data transmission depends on the tracking accuracy of the subscriber's location, although the exact UE location cannot be determined from the event data. For example, a location area update (LAU) is one of the event data generated by the UE. If UE 101 is mobile and crosses the boundary of a location area composed of a single or several BSs including sectors, UE 101 transmits the LAU as the event data to the network via the nearest BS when UE 101 identifies a different location area. In FIG. 1, as an example, UE 101 moves from one location area 107 to another location area 109. Once UE 101 detects the different location area 109 from the previous location area 107, UE 101 transmits the LAU to the nearest BS 103. In spite of transmitting hundreds of event data from UE 101, the event data received at the sector does not indicate an exact location of UE 101. The location of UE based on the event data can be estimated at the sector level if the sector is implemented in the BS. In FIG. 1, BS 103 has three sectors 105.

A method and apparatus for estimating travel behavior in a mobile network are disclosed. In one embodiment, estimating travel behavior includes receiving event data indicative of user equipment location. After receipt, the event data is pre-processed to produce pre-processed data. In one embodiment, the pre-processing of received event data produces pre-processed data by converting SAI data to latitude and longitude values and estimating a location of an individual's user equipment based on the latitude and longitude values. In one embodiment, the latitude and longitude values correspond to one selected from a group consisting of: sector center, sector edge, mesh center, and multiple points within a sector. After pre-processing, the pre-processed data is filtered to select a portion of user equipment location information in the pre-processed data. In one embodiment, the filtering of the pre-processed data to select a portion of user equipment location information in the pre-processed data is based on one or more selected from a group consisting of: time and area, a day of the week, and one or more personal attributes. Next, straight line interpolation is performed on the filtered, pre-processed event data of one or more individuals in the population to estimate intermediate positions of a trajectory of each of the one or more individuals from a first position to a second position. In one embodiment, the straight line interpolation is based on a straight line between event data. In one embodiment, the straight line is between sector centers. Thereafter, a number of individuals in population at a given time and at a given area is counted. In one embodiment, counting a number of individuals in population is performed per one or both of sector and mesh.

Figure 3:
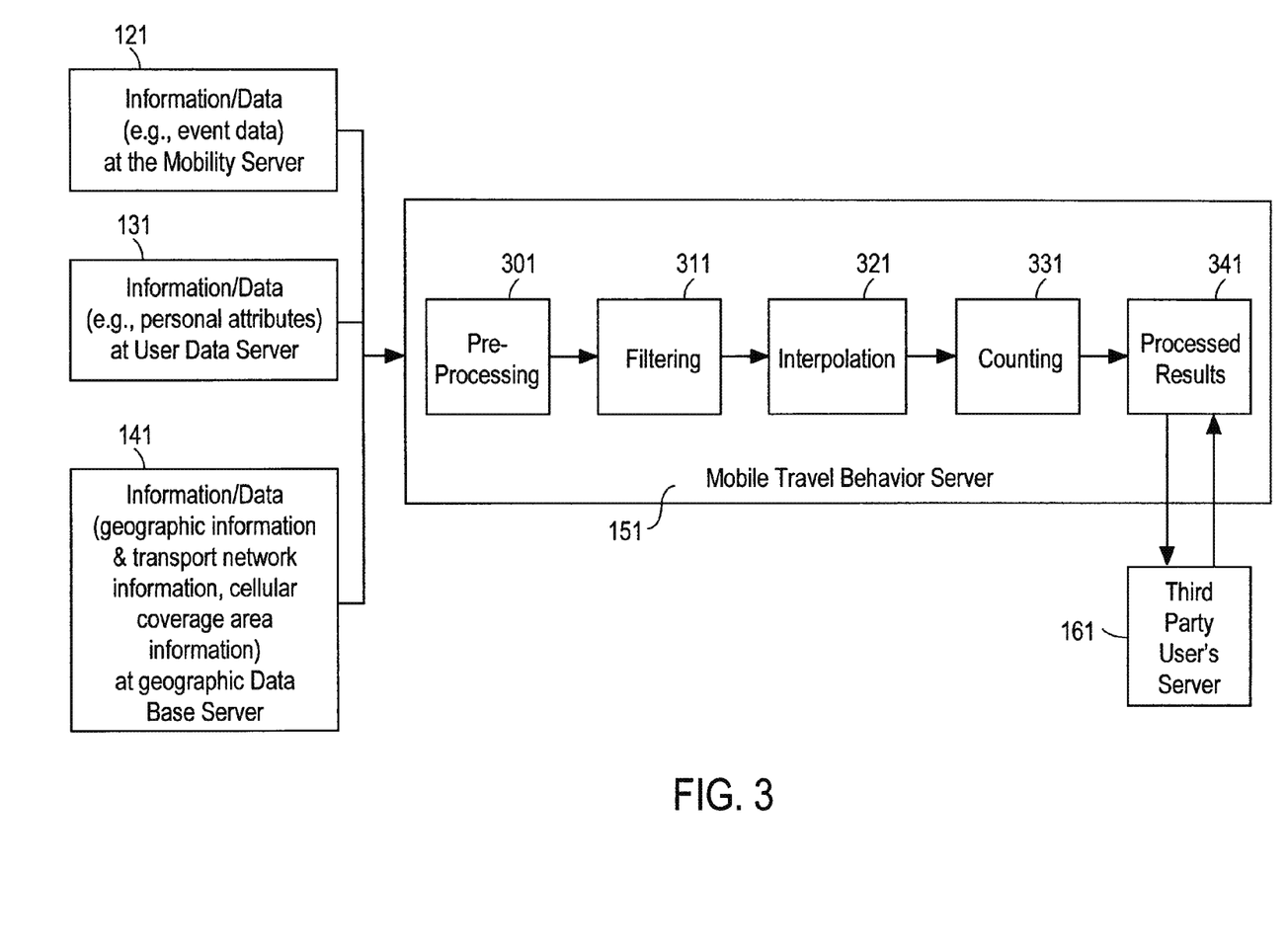
FIG. 3 is a data flow diagram illustrating user's trajectory estimation and dynamic population migration counting processes performed at the mobile travel behavior server according to one embodiment.

FIG. 3 is a data flow diagram illustrating user's trajectory estimation and dynamic population migration counting processes at the mobile travel behavior server according to one embodiment. In one embodiment, the processes are performed by processing logic that may comprise hardware (circuitry, dedicated logic, etc.), software (such as is run on a general purpose computer system or a dedicated machine), or a combination of both. In one embodiment, the processing logic is part of mobile travel behavior server 151.

Referring to FIG. 3, the processing begins with the mobile behaviour server 151 gathering information/data from mobility server 121, user data server 131 and geographical data base server 141. In addition to the above servers, mobile travel behavior server 151 may need to obtain other information/data from other servers.

Using the gathered data, the mobile travel behavior server 151 performs mobile travel behavior analysis by pre-processing information/data obtained from different servers (processing block 301), filtering pre-processed information/data (processing block 311), interpolating user's trajectory from the source (starting) position to the destination (processing block 321), and counting the number of individuals in population at a given time and at a given area (processing block 331). Although the following example describes this method and apparatus using one mobile travel behavior server 151, it may be implemented using multiple mobile travel behavior servers.

The operation of gathering information/data from servers generally involves: (a) establishing a protocol for communicating among servers; (b) establishing a protocol for manipulating servers; and (c) selecting necessary information/data for pre-processing input.

In one embodiment, event data 201 is stored at mobility server 121, and personal attribute data are stored in user data server 131. Geographic information & transport network information as well as the cellular coverage information such as, for example, the BS location information and number of sectors per BS, are stored in geographical data base server 141. In one embodiment, the event data contains one or more of a user identification (e.g., UID), time-stamp and update message type information (e.g., periodic registration message (PRM) and location area update message (LAU)). In one embodiment, one or more of the personal attribute data such as, but not limited to, age, gender, demographic characteristics, and/or address are also used in making full statistical analysis. For example, the statistical analysis may wish to be limited to the population movement of all females within the ages of 25-44. The cellular coverage information is used in the pre-processing operation (e.g., processing block 301 described below), and the geographic information & transport network information is used at the user's trajectory interpolation operation (e.g., processing block 321 described below).

Figure 4:
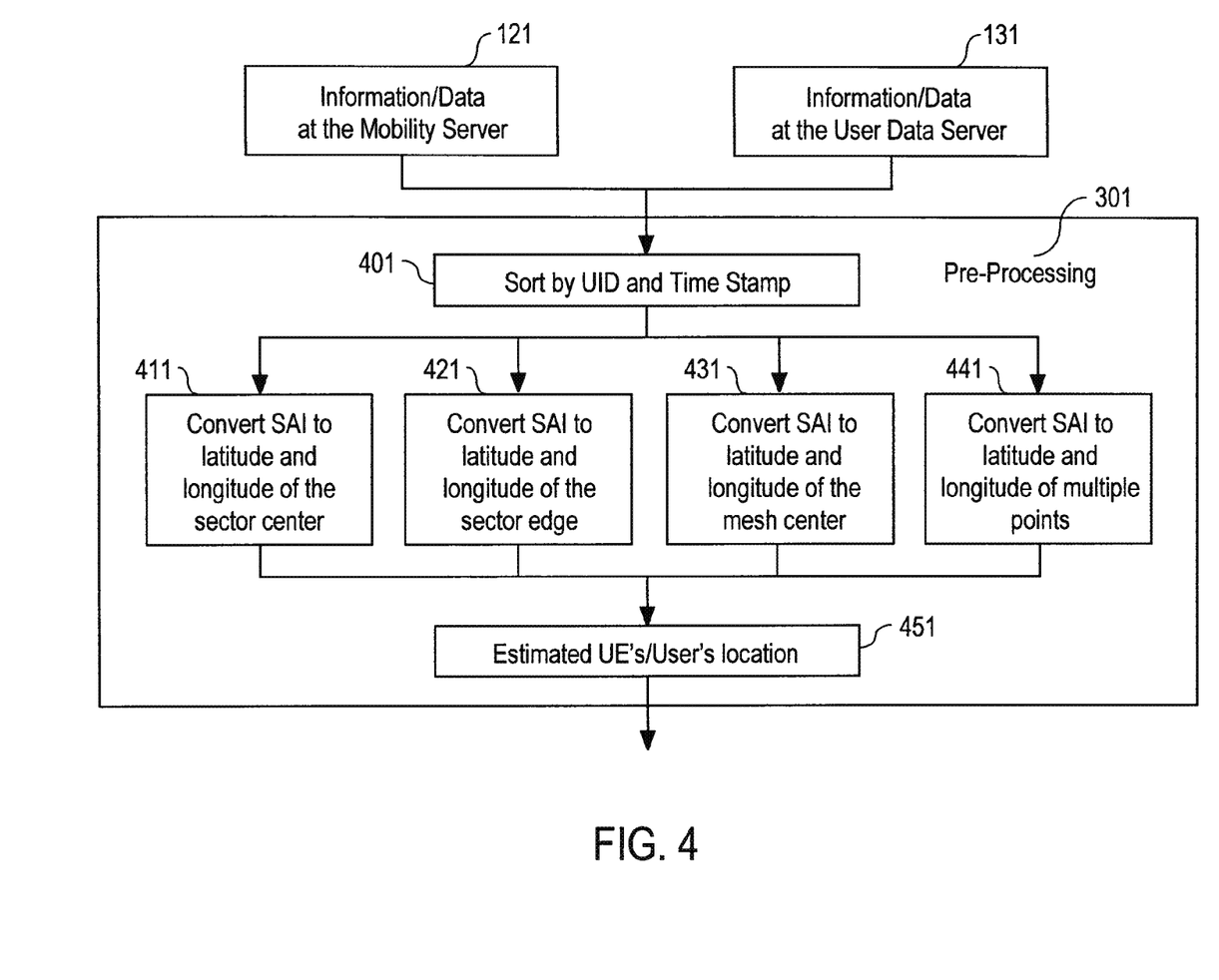
FIG. 4 is a data flow diagram illustrating a pre-processing process to identify UE'/user's locations according to one embodiment.

FIG. 4 is a data flow diagram of one embodiment of a pre-processing process performed at mobile travel behaviour server 151. The process is performed by processing logic that may comprise hardware (circuitry, dedicated logic, etc.), software (such as is run on a general purpose computer system or a dedicated machine), or a combination of both.

Referring to FIG. 4, the process begins with information from mobility server 121 and/or user data server 131 and generally involves: (a) sorting event data based on system information and time (e.g., UID and time stamp information) (processing block 401); at least one of (b) converting service area identity (SAI) information into the latitude and the longitude information of the sector center (processing block 411), the sector edge (processing block 421), the mesh center optionally (processing block 431), or multiple points optionally (processing block 441); and estimating locations of UEs/users based on the converted SAI information (processing block 451). The SAI is used to identify an area consisting of one or more cells or sectors belonging to the same location area. Such an area is referred to herein as a service area and can be used for indicating the location of the UE to the core network.

Since a total number of event data generated by the UEs in the cellular system is extremely large, event data 201 may be stored in many different mobility servers 121. In such a case, the mobility server consists of one or more servers. In order to access these event data easily, mobile travel behavior server 151 or the mobility server 121 sorts them based on UID and time stamp for future processing (processing block 401), even if the event data is stored at a group of different servers. The data may be provided to mobile travel behaviour server using a push or pull model.

In one embodiment, when transforming of SAI information such as LAC and sector ID to the latitude and longitude information of the sector center, a sector edge, the mesh center or multiple points, respectively, the location of BS receiving the event data is used as basic information for identifying the estimated UE's location 451.

Note the conversion of SAI to latitude and longitude of multiple points is useful in situations where multiple sources in a sector (e.g., starting positions) are being used and multiple trajectories are being computed for an individual. In such a case, the probability of the likelihood the UE/user travelled one trajectory versus another is used to determine which trajectory is selected for use as part of the population counting process.

Figure 5:
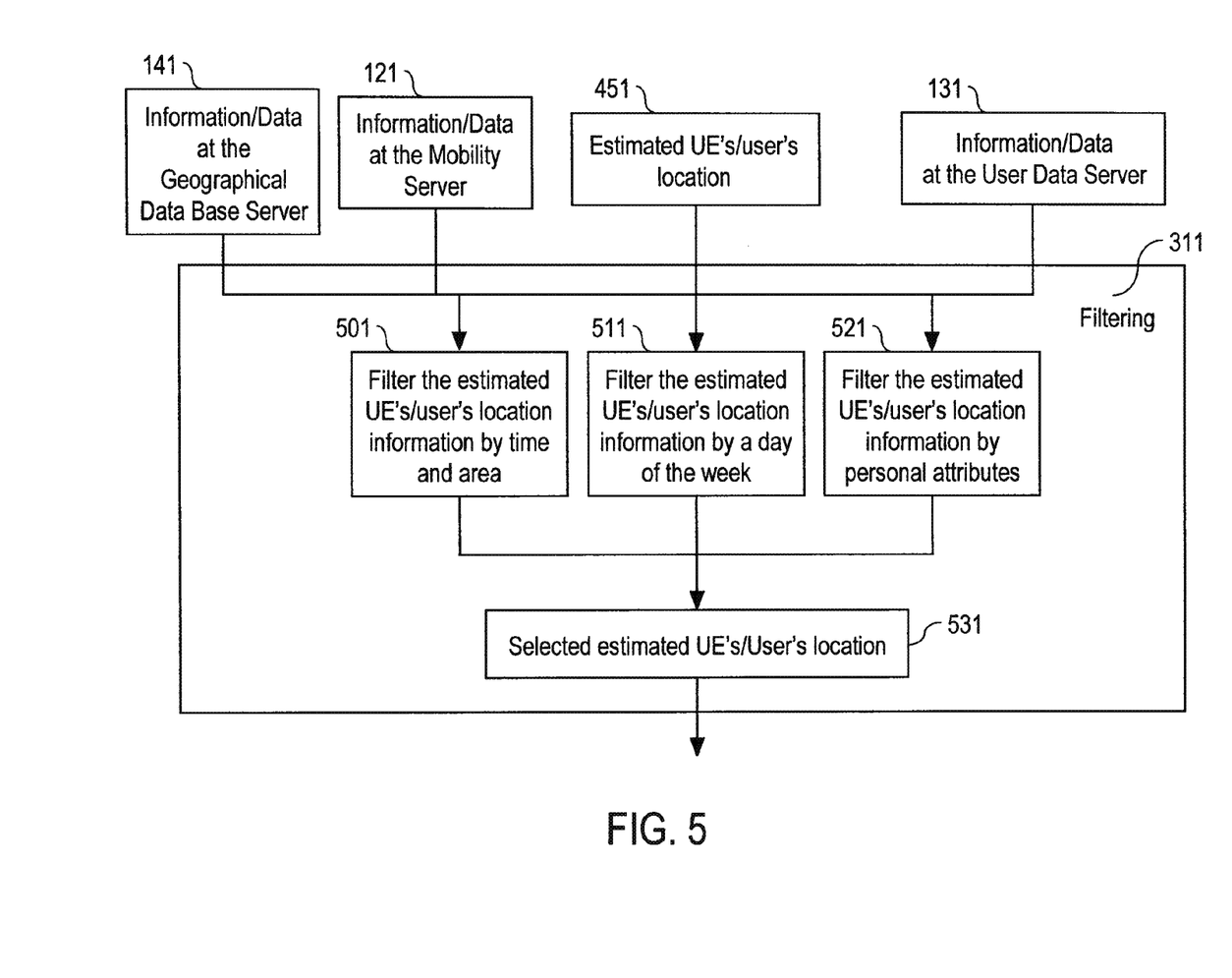
FIG. 5 is a data flow diagram illustrating a filtering process to obtain selected UE's/user's locations according to one embodiment.

FIG. 5 is a data flow diagram illustrating a filtering process to obtain selected UE's/user's locations according to one embodiment. In one embodiment, the filtering process is performed by processing logic that may comprise hardware (circuitry, dedicated logic, etc.), software (such as is run on a general purpose computer system or a dedicated machine), or a combination of both. In one embodiment, the processing logic is part of mobile travel behavior server 151.

Referring to FIG. 5, the filtering process begins at the mobile travel behavior server with selected estimated location information of UEs/users and may include data from geographical database server 141, data from mobility server 121, and/or data from user data server 131 and generally involves one or more of: (a) filtering the event data to reduce event data that is redundant based on one or both of area and time (processing block 501); (b) filtering the event data based on personal attribute, such as those described herein (processing block 511); and (c) filtering the event data according to day of the week (processing block 521).

After performing filtering based on redundancy, personal attribute and/or day of week, processing logic selects the estimated location of UEs/users (processing block 531). By selecting the event data, the mobile travel behavior server analyzes the event data quickly because the data set is reduced in size. For instance, most of the worker goes to an office in the morning and go back to their home in evening using same transportation method and same transport network route. In one embodiment, the averaging and filtering remove irregular movement patterns during week days.

Figure 6:
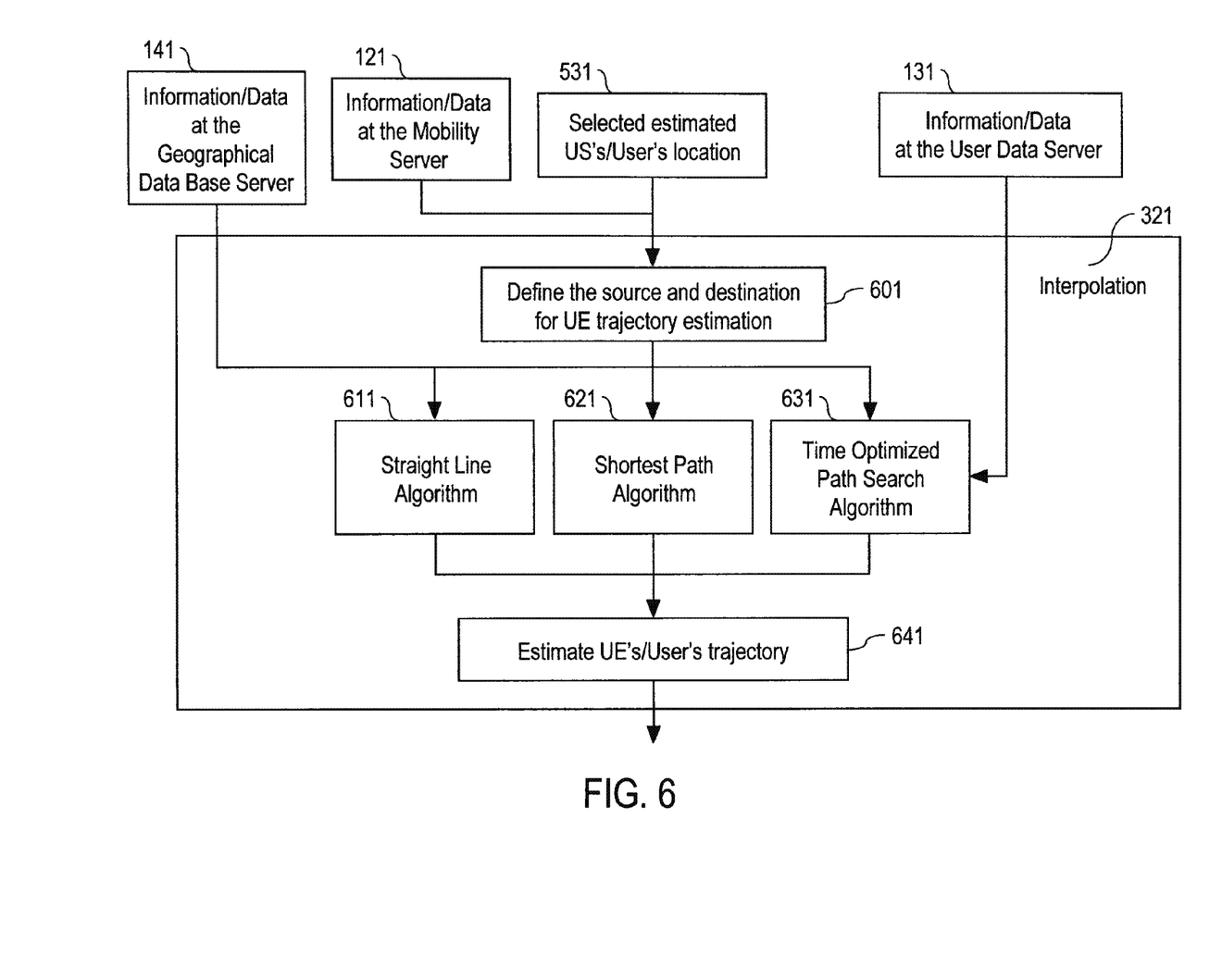
FIG. 6 is a data flow diagram illustrating an interpolation process to estimate UE's/user's trajectory from source to destination according to one embodiment.

FIG. 6 is a data flow diagram illustrating an interpolation process to estimate UE's/user's trajectory from source to destination according to one embodiment. In one embodiment, the interpolation process is performed by processing logic that may comprise hardware (circuitry, dedicated logic, etc.), software (such as is run on a general purpose computer system or a dedicated machine), or a combination of both. In one embodiment, the processing logic is part of mobile travel behavior server 151.

Referring to FIG. 6, the trajectory interpolation process begins at the mobile travel behavior server with selected estimated location information of UEs/users and may include data from geographical database server 141, data from mobility server 121, and/or data from user data server 131 and generally involves: (a) interpolating transport network route by the straight line algorithm (processing block 611); (b) interpolating transport network route by the shortest path algorithm (processing block 621); and (c) interpolating transport network route by the time optimized path search algorithm (processing block 631). Implementations of these algorithms are well-known to those skilled in the art. These algorithms sometimes utilize the geographic information & transport network information. All of interpolation algorithms set the user's source and destination positions before analyzing data (processing block 601).

The straight line interpolation algorithm simply connects the user's source (e.g., a starting position) and the user's destination directly and generates an estimated user's position by use of arbitrary granularity like, for example, but not limited to, every 1 min, 5 min, 10 min, or every 100 m, 250 m, 500 m. The shortest path interpolation connects the user's source and the user's destination based on shortest path algorithm such as, for example, Dijkstra's algorithm, A* algorithm, Dempster-Shafer method, and so forth. In one embodiment, weights based on geographic information & transport network information in the sector or in the mesh or the sector/mesh are set up. These are based related road routes and railways routes. Using this information, a user's estimated trajectory path may be found.

In one example, the geographical area is partitioned into several levels of meshes which are typically square-shaped, and their size may range from several tens of kilometers to several hundreds of meters. An example of mesh size used for population counting/tracking purposes is 500 meters by 500 meters. For urban areas, a sector in the BS may contain only few meshes, while for rural areas, large number of meshes may be comprised of the sector. All of meshes take into account of geographic information & transport network information, and the mesh-based trajectory estimation is performed in the same way sector-based estimation is performed.

In one embodiment, a time optimized path search is performed which takes into the account of required time from a source to destination and finds a best matched route.

Figure 7:
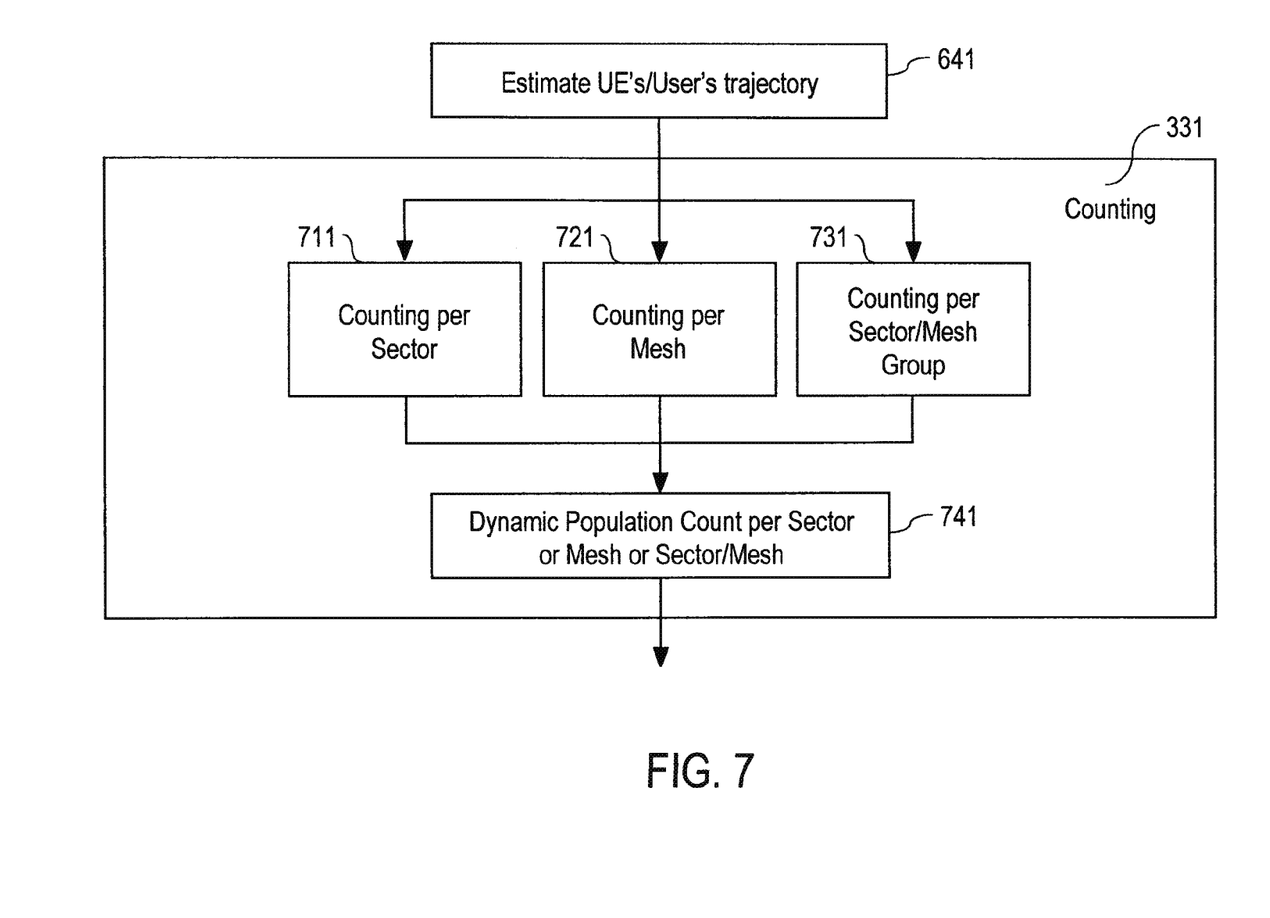
FIG. 7 is a data flow diagram illustrating a dynamic population counting process according to a one embodiment.

FIG. 7 is a data flow diagram illustrating dynamic population counting process according to a one embodiment. In one embodiment, the dynamic population counting process is performed by processing logic that may comprise hardware (circuitry, dedicated logic, etc.), software (such as is run on a general purpose computer system or a dedicated machine), or a combination of both. In one embodiment, the processing logic is part of mobile travel behavior server 151.

Referring to FIG. 7, the dynamic population counting process begins with estimated trajectory data for UEs/users at the mobile travel behavior server and generally involves one or more of: (a) counting individuals in a population based on sector (processing block 711); (b) counting individuals in a population based on mesh (processing block 721); and (c) counting individuals in a population based on sector and mesh group (processing block 731). In one embodiment, the mobile travel behavior server converts the estimated UE position based on the location of BS receiving the event data to a target area, such as a sector, or a mesh, or a sector/mesh group area, and the mobile travel behavior server removes duplicated UEs in each area if any. Then, the mobile travel behavior server obtains a count of dynamic population movement per sector, mesh or sector/mesh (processing block 741).

In one embodiment, the mobile travel behavior server shows a distribution of user equipment gathered at a given location or scattered from a given location. In another embodiment, the mobile travel behaviour server shows the characteristics of population movement between two given points. Note that in yet another embodiment, mobile travel behaviour server shows both a distribution of user equipment gathered at a given location or scattered from a given location and the characteristics of population movement between two given points. Preparing and illustrating such distributions would be well-known to those skilled in the art.

When the dynamic population migration is identified at the sector, or mesh or a group of sector and mesh level, an instant population census called "mobile census" using person attribute information within a given geographical area can be obtained.

An Example of a Computer System

Figure 8:
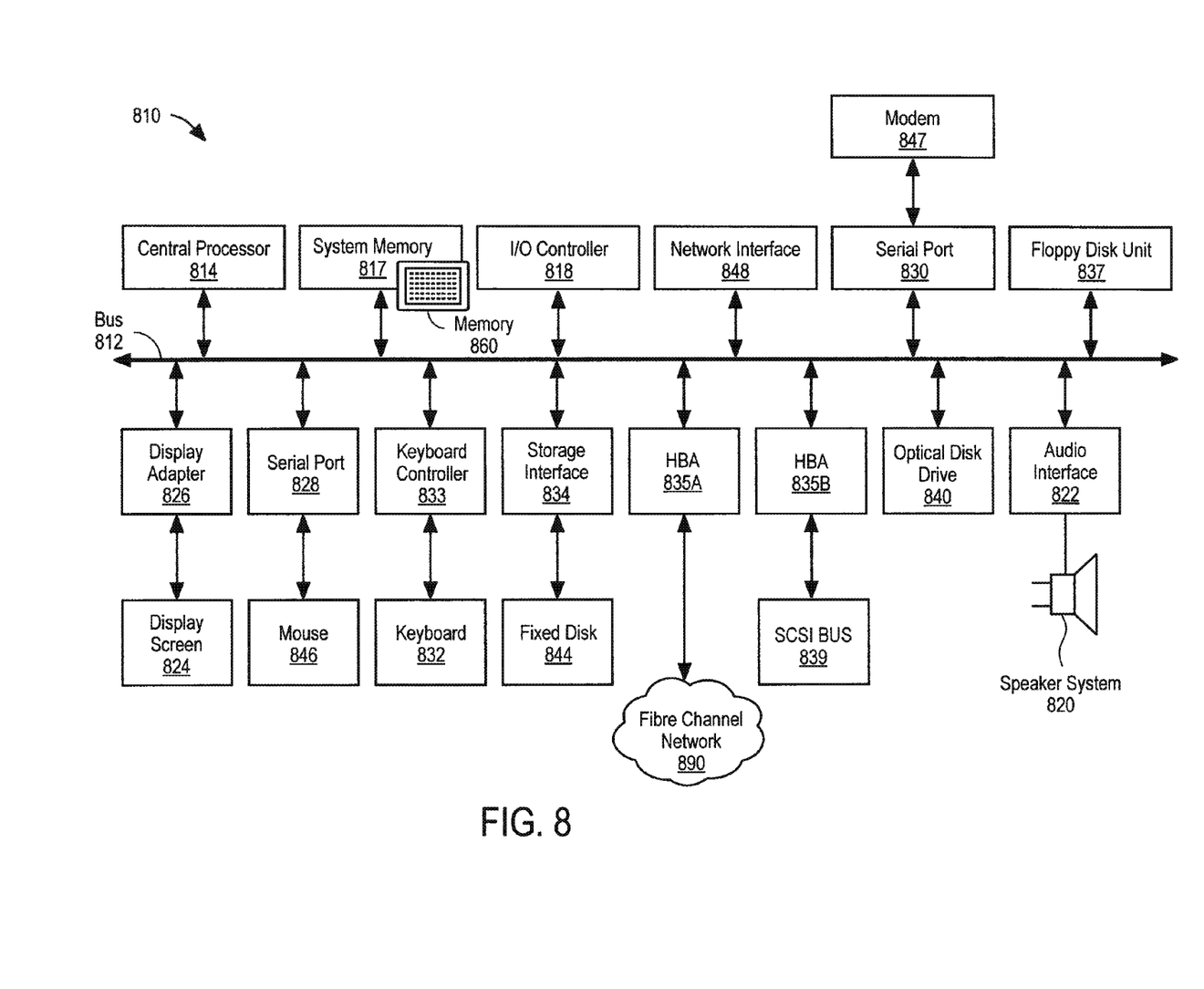
FIG. 8 depicts a block diagram of a computer system.

FIG. 8 depicts a block diagram of a mobile travel behavior server, such as mobile travel behavior server 151 of FIG. 1. Referring to FIG. 8, mobile travel behavior server 810 includes a bus 812 to interconnect subsystems of mobile travel behavior server 810, such as a processor 814, a system memory 817 (e.g., RAM, ROM, etc.), an input/output controller 818, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817. System memory 817 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with mobile travel behavior server 810 are generally stored on and accessed via a computer readable medium, such as a hard disk drive (e.g., fixed disk 844), an optical drive (e.g., optical drive 840), a floppy disk unit 837, or other storage medium.

Storage interface 834, as with the other storage interfaces of mobile travel behavior server 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, a packet connection, digital satellite data connection or the like.

Many other devices or subsystems (not shown) may be connected in a similar manner (e.g., document scanners, digital cameras and so on). Conversely, all of the devices shown in FIG. 8 need not be present to practice the techniques described herein. The devices and subsystems can be interconnected in different ways from that shown in FIG. 8. The operation of a computer system such as that shown in FIG. 8 is readily known in the art and is not discussed in detail in this application.

Code to implement the techniques described herein can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system. In one embodiment, system memory 817 stores event data, pre-processed data, filtered data, interpolation data and population count data.

Figure 9:
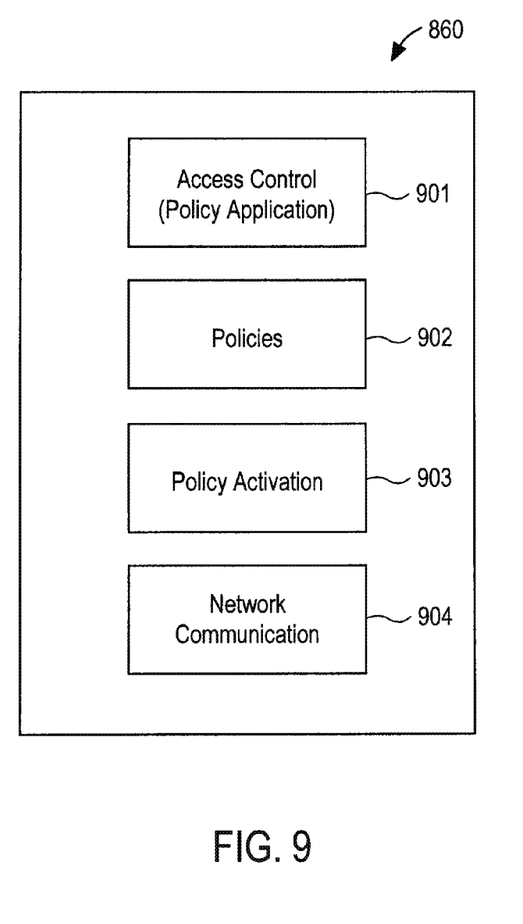
FIG. 9 illustrates a set of programs and data that is stored in memory of one embodiment of a computer system.

FIG. 9 illustrates a set of code (e.g., programs) and data that is stored in memory of one embodiment of a mobile travel behavior server, such as the mobile travel behavior server 151 set forth in FIG. 3. The mobile travel behavior server uses the code, in conjunction with a processor, to implement the necessary operations to implement the processing for estimating travel behavior in a mobile network.

Referring to FIG. 9, the memory 860 stores event data 901 indicative of user equipment location. A pre-processing module 902 which when executed by a processor is responsible for pre-processing received event data to produce pre-processed data. A filter module 903 which when executed by a processor is responsible for filtering the pre-processed data to select a portion of user equipment location information in the pre-processed data. An interpolation module 904 which when executed by a processor is responsible for performing straight line interpolation on pre-processed data of one or more individuals in the population to estimate intermediate positions of each of the one or more individual. A count module 905 which when executed by a processor is responsible for counting population movement. The memory also includes a network communication module 906 used for performing network communication and communication with the other devices (e.g., servers, clients, etc.).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for estimating travel behavior in a mobile network, the method comprising:
   receiving event data comprising mobile phone control data indicative of user equipment location and user data indicative of one or more personal attributes associated with an user of each user equipment;
   pre-processing the received event data to produce pre-processed data;
   filtering the pre-processed data to select a portion of user equipment location information in the pre-processed data based at least in part on one or more selected personal attributes;
   performing straight line interpolation on filtered pre-processed data of one or more users in a population to estimate intermediate positions of a trajectory of each of the one or more users from a first position to a second position using a shortest path estimation algorithm that determines a shortest path between pairs of points to estimate a complete trajectory for each of the one or more users based on the filtered pre-processed data; and
   counting a number of users in the population at a given time and at a given area based on one or more of the intermediate positions of the trajectory to determine movement of a portion of the population having the one or more selected personal attributes.

2. The method defined in claim 1 wherein the filtering the pre-processed data to select the portion of user equipment location information in the pre-processed data is based on one or more selected from a group consisting of: time and area, and a day of the week.

3. The method defined in claim 1 wherein the pre-processing the received event data to produce the pre-processed data comprises: converting service area identification (SAI) data to latitude and longitude values; and estimating a location of the user's user equipment based on the latitude and longitude values.

4. The method defined in claim 3 wherein the latitude and longitude values correspond to one selected from a group consisting of: sector center, sector edge, mesh center, and multiple points within a sector.

5. The method defined in claim 1 wherein the counting the number of users in the population at the given time and at the given area is performed per one or both of sector and mesh.

6. The method defined in claim 1 wherein the straight line interpolation is based on a straight line between the event data.

7. The method defined in claim 6 wherein the straight line is between sector centers.

8. The method defined in claim 1 wherein the event data comprises user identification (UID) information and time stamp information.

9. An apparatus comprising:
   a memory to store instructions;
   a processor coupled to the memory to execute instructions from the memory, wherein in response to executing the instructions, the processor
   receives event data comprising mobile phone control data indicative of user equipment location and user data indicative of one or more personal attributes associated with an user of each user equipment, pre-processes the received event data to produce pre-processed data,
   filters the pre-processed data to select a portion of user equipment location information in the pre-processed data based at least in part on one or more selected personal attributes,
   performs straight line interpolation on filtered pre-processed data of one or more users in a population to estimate intermediate positions of a trajectory of each of the one or more users from a first position to a second position using a shortest path estimation algorithm that determines a shortest path between pairs of points based on weights to estimate a complete trajectory for each of the one or more users based on the filtered pre-processed data, and
   counts a number of users in the population at a given time and at a given area based on one or more of the intermediate positions of the trajectory to determine movement of a portion of the population having the one or more selected personal attributes.

10. The apparatus defined in claim 9 wherein the processor filters the pre-processed data to select the portion of user equipment location information in the pre-processed data based on one or more selected from a group consisting of: time and area, and a day of the week.

11. The apparatus defined in claim 9 wherein the processor pre-processes the received event data to produce the pre-processed data by: converting service area identification (SAI) data to latitude and longitude values; and estimating a location of the user's user equipment based on the latitude and longitude values.

12. The apparatus defined in claim 11 wherein the latitude and longitude values correspond to one selected from a group consisting of: sector center, sector edge, mesh center, and multiple points within a sector.

13. The apparatus defined in claim 9 wherein the processor counts the number of users in the population per one or both of sector and mesh.

14. The apparatus defined in claim 9 wherein the straight line interpolation is based on a straight line between the event data.

15. The apparatus defined in claim 14 wherein the straight line is between sector centers.

16. A product having one or more non-transitory computer readable storage media storing executable instructions thereon which when executed cause a system to perform a method for estimating travel behavior in a mobile network, the method comprising:
   receiving event data comprising mobile phone control data indicative of user equipment location and user data indicative of one or more personal attributes associated with an user of each user equipment;
   pre-processing the received event data to produce pre-processed data;

filtering the pre-processed data to select a portion of user equipment location information in the pre-processed data based at least in part one or more selected personal attributes;

performing straight line interpolation on filtered pre-processed data of one or more users in a population to estimate intermediate positions of a trajectory of each of the one or more users from a first position to a second position using a shortest path estimation algorithm that determines a shortest path between pairs of points based on weights to estimate a complete trajectory for each of the one or more users based on the filtered pre-processed data; and counting a number of users in the population at a given time and at a given area based on one or more of the intermediate positions of the trajectory to determine movement of a portion of the population having the one or more selected personal attributes.

17. The product defined in claim 16 wherein the method further comprises the filtering the pre-processed data to select the portion of user equipment location information in the pre-processed data based on one or more selected from a group consisting of: time and area, and a day of the week.

18. The product defined in claim 16 wherein the pre-processing the received event data to produce the pre-processed data comprises:

converting service area identification (SAI) data to latitude and longitude values; and estimating a location of the user's user equipment based on the latitude and longitude values.

19. The product defined in claim 18 wherein the latitude and longitude values correspond to one selected from a group consisting of: sector center, sector edge, mesh center, and multiple points within a sector.

20. The product defined in claim 16 wherein the counting the number of users in the population is performed per one or both of sector and mesh.

* * * * *